United States Patent

[11] 3,594,585

[72] Inventor Joseph A. Bourget
Glencoe, Md.
[21] Appl. No. 733,405
[22] Filed May 31, 1968
[45] Patented July 20, 1971
[73] Assignee Chesapeake Systems Corporation
Cockeysville, Mo.

[54] PULSE RECOGNITION CIRCUIT

13 Claims, 1 Drawing Fig.

[52] U.S. Cl. .... 307/234, 307/231, 328/111, 328/114
[51] Int. Cl. .... H03k 5/20
[50] Field of Search .... 328/111, 112, 114; 307/234

[56] References Cited

UNITED STATES PATENTS

| | | | |
|---|---|---|---|
| 2,275,930 | 3/1942 | Torcheux | 328/111 |
| 2,552,013 | 5/1951 | Orpin | 328/112 |
| 2,579,473 | 12/1951 | Chatterjea | 328/111 |
| 2,589,833 | 3/1952 | Longmire et al. | 328/111 |
| 2,609,501 | 9/1952 | Guthrie | 328/112 |
| 3,263,098 | 7/1966 | Willard | 328/111 |
| 3,448,290 | 6/1969 | Newcomb | 328/111 |

OTHER REFERENCES

" Versatile Discriminator Measures Pulse Length" by Whittington & Robson, ELECTRONICS, Vol. 35 No. 31 Aug. 3, 1962 pages 48

*Primary Examiner*—John S. Heyman
*Assistant Examiner*—Harold A. Dixon
*Attorney*—Jones & Lockwood

ABSTRACT: The disclosure describes a circuit capable of recognizing a succession of changes in an electrical signal and of discriminating against signals having amplitude, duration or fall times which lie outside predetermined values. The circuit requires no separate power supply, relaying on the input signal for its power supply and thus consuming no power during standby, and provides a combination of elements which is sensitive to voltage level changes appearing at discrete time intervals.

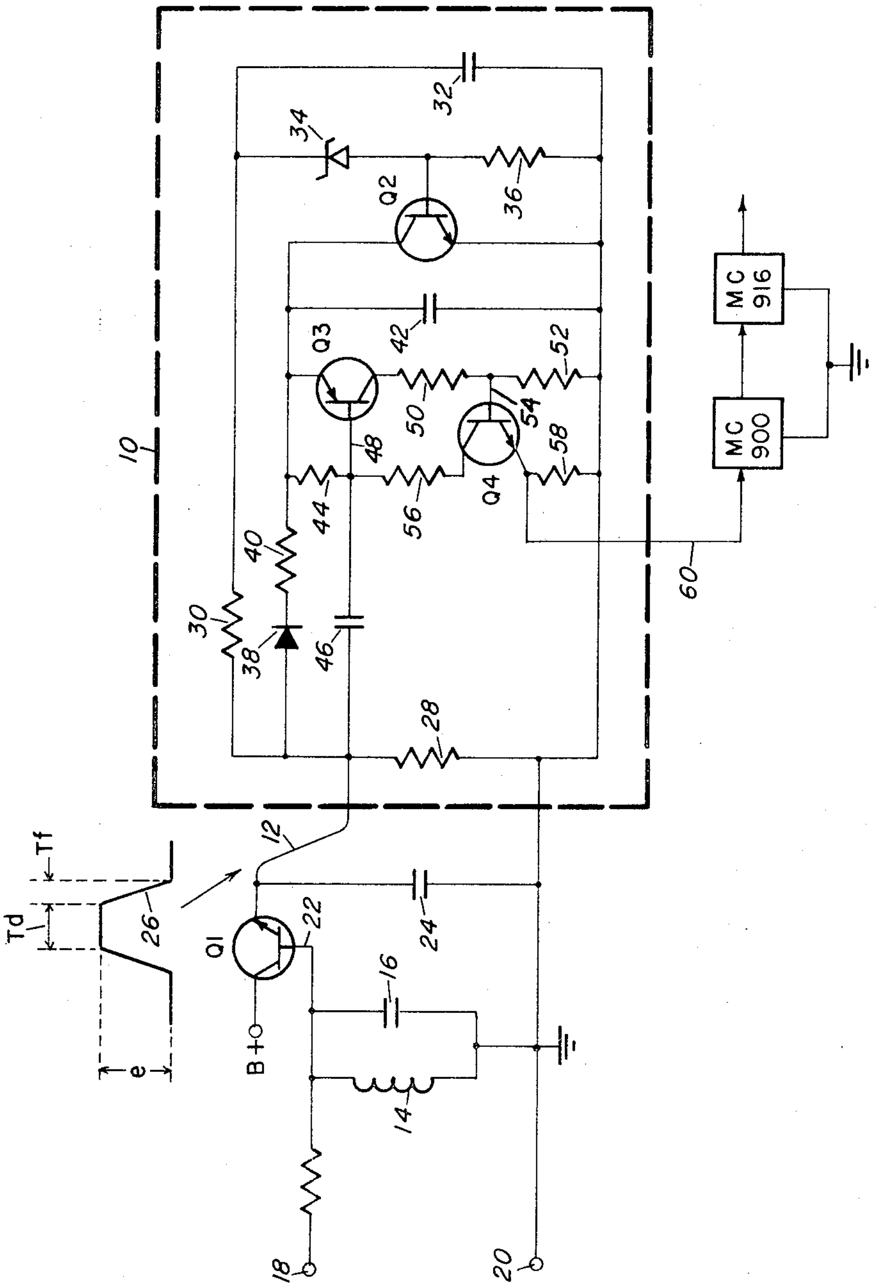
INVENTOR
JOSEPH A. BOURGET
BY Beale and Jones
ATTORNEYS

PULSE RECOGNITION CIRCUIT

FIELD OF THE INVENTION

The present invention relates, in general, to discriminator circuitry which is capable of distinguishing desired signals from background noise, and more particularly relates to a circuit responsive only to signals having a predetermined amplitude, pulse duration and fall time to thereby achieve maximum signal detectability.

BACKGROUND OF THE INVENTION

With the continuing and increasing exploration of remote areas of the globe, and particularly in underwater explorations, great reliance is placed on electronic equipment for the protection of human life and safety. To remove as far as possible the factor of human error, automatic control systems are handling more and more of the essential functions required in such operations. A practical example of such reliance is in the area of undersea drilling, where the very lives of the drilling crews are dependent upon fast and reliable control equipment for guiding the drilling equipment, sensing malfunctions, monitoring the operation and providing communication between drilling platforms on the water's surface and the drill hole location on the ocean floor. Drilling platforms are extremely vulnerable to mishaps in the drilling operation, and it is therefore important to establish reliable control between equipment at the surface and that located at the ocean floor.

The environment surrounding electronic equipment located at the ocean floor and the medium through which communication must be made presents an enormous problem to equipment designers. The electronic equipment must withstand severe environmental conditions while remaining exceedingly reliable in operation. Further, underwater telemetry is very difficult because of the problems presented by water turbulence, temperature interfaces, current flow interfaces and the like which cause multipath transmissions and which produce a considerable amount of background noise.

To overcome these problems, and to produce a circuit which will respond to desired information signals while rejecting interfering noise, jamming signals, spurious reflections or the like has long been a problem in the field of telemetry. It is therefore an object of the present invention to provide a circuit which will substantially increase the reliability of pulse telemetry communication and further to produce a circuit which is rugged and reliable and which may be used in inaccessible areas for long periods of time.

SUMMARY OF THE INVENTION

The present invention contemplates a solid state active circuit utilizing a plurality of passive time delay, or storage, networks, each such network responding to a specific feature of an input signal. If the predetermined features are present in their proper order, an active transistorized latching circuit associated with the time delay networks will become conductive to produce an output signal. Any variance in the predetermined sequence of events will prevent the output signal from being produced; thus, the circuit is a "go, no-go" circuit which produces an output only when the proper input is present.

According to the invention, a first network is provided which is sensitive to the length of an input signal. If the input is too short, the required conducting threshold will not be attained, while too long a signal will cause the wrong transistor to become conductive, thus discharging the circuit. The pulse amplitude must be sufficiently large to cause the proper transistor to become conductive if the pulse is of the proper duration; a low amplitude will not produce the required condition even if it lasts the proper length of time. Finally, if the fall time of the pulse input signal, i.e., the time required for the signal to fall from its peak amplitude to the zero level, is too slow, a network sensitive to this fall time will prevent the proper bias from being applied to the latching switch, and thus will prevent an output signal from appearing. However, upon reception of a valid signal, the circuit will latch and produce a sharp output pulse. The circuit storage networks are arranged to permit the power received from the input signal to be used to energize the active elements in the circuit, and this eliminates the necessity for a battery power supply, thus extending the circuit reliability over long periods of time, a particularly valuable feature where the circuit is used in remote or inaccessible areas.

BRIEF DESCRIPTION OF THE DRAWING

The foregoing and additional objects, features and advantages of the present invention will be more fully appreciated when considered in the light of the following specification and the single drawing, which is a schematic diagram of a circuit in accordance with the present invention shown in an environment which illustrates one possible use.

DESCRIPTION OF A PREFERRED EMBODIMENT

The circuit diagram of the accompanying drawing illustrates in block 10 a signal recognition circuit in accordance with the present invention. The input signal which is to be tested for predetermined characteristics input signal this circuit is received on line 12. This input signal may be supplied by way of an input resonant circuit comprising an inductor 14 and a capacitor 16 connected in parallel across the input terminals 18 and 20. The resonant circuit may be tuned, for example, to the center frequency of a selected sine wave signal to be received at terminals 18 and 20, with the resultant signal which appears across the parallel circuit being applied to the base 22 of a transistor amplifier-detector Q1. The output of Q1, which is connected in emitter follower configuration, is applied across filter capacitor 24 to input line 12. The input signal so applied to line 12, which is a rectified version of the signal applied to the base of Q1, is diagrammatically illustrated at 26, and is shown as a generally trapezoidal pulse signal 26. This pulse input has an amplitude $e$, which may be determined by the saturation point of transistor Q1, with the maximum amplitude plateau of the pulse having a time duration $Td$. The pulse has a trailing edge fall time $Tf$. The exact shape of pulse 26 has been arbitrarily chosen to illustrate the principles of the invention, and it will be apparent from what follows that various pulse configurations may be used with only slight variations in the parameters of circuit 10.

The input to line 12 is applied across input resistor 28 which is, in effect, the load resistor for emitter follower Q1 which is a half wave detector having a current gain $\alpha$. Thus, an input pulse 26 appears across resistor 28, which is connected between line 12 and ground. Pulse 26 is also applied by way of resistor-capacitor storage network 30, 32 to the base of a pulse duration limiting transistor Q2, the junction of resistor 30 and capacitor 32 being connected to the base of transistor Q2 by way of a Zener diode 34. This diode serves as a voltage threshold to the action of Q2 to insure that Q2 will conduct only upon the existence of a predetermined voltage level across capacitor 32, and thus serves to establish the operation of the circuit in response to pulses that are too long. The base of Q2 is connected to ground by way of resistor 36, this latter resistor and Zener diode 34 serving as a voltage divider across capacitor 32 to control the conductivity of Q2. Thus, storage network 30, 32 is a timing network which has a time constant greater than the duration $Td$ of the desired input pulse so that the voltage across capacitor 32 will be sufficient to cause Q2 to conduct only when the input pulse is too long.

Pulse 26 appearing on line 12 is also applied through diode 38 to an amplitude and time duration sensing RC storage network comprised of resistor 40 and capacitor 42 connected between diode 38 and ground. Capacitor 42, which is connected across the collector-emitter electrodes of transistor Q2 and is discharged by the conduction of Q2, will not charge to its rated voltage if the applied signal does not have the proper amplitude; a lesser amplitude will result in a lesser charge on the capacitor. RC timing network 40, 42 also serves as a pulse length detector, for its time constant is approximately equal to the selected duration T*d* of the desired input pulse. Thus the charge on capacitor 42 not only is responsive to the pulse amplitude but to the pulse duration; if pulse 26 is not sufficiently long, capacitor 42 will not charge to its full voltage even if the pulse is of rated amplitude, and if the pulse 26 is not of sufficient amplitude the capacitor will not charge to its full voltage, even if the pulse is the proper length.

A fall time sensing RC timing network comprised of resistor 44 and capacitor 46 is connected from the junction of resistor 40 and capacitor 42 to the input line 12, in parallel to resistor 40 and diode 38, the time constant of network 44, 46 being adjusted to be greater than the fall time T*f* of the pulse which is to be detected. This network provides the bias and turn on voltage to the base 48 of a transistor switch Q3, the emitter of Q3 being connected to the junction of resistor 40 and capacitor 42, while its collector is connected through resistor 50 and 52 to ground. The latter resistors act as a voltage divider for the base 54 of a second transistor switch Q4 which is the complement of transistor Q3, with the collector of Q4 being connected to the base of Q3 through resistor 56 and the emitter being connected through resistor 58 to ground. The complementary transistors Q3 and Q4 are of opposite conductivity types, with the collector circuit of Q3 comprising a voltage divider biasing circuit for the base of Q4 and the collector circuit of Q4 comprising by way of resistors 44 and 56 a voltage divider biasing circuit for the base of transistor Q3. This results in Q4 becoming conductive when Q3 is made conductive by an input pulse, if the pulse characteristics have the preselected values, the two transistors remaining conductive until the energy stored in capacitor 42 decays below the threshold of conductivity. The switch Q3–Q4 then unlatches, and the circuit returns to its rest condition.

An output is derived from circuit 10 upon conduction of transistors Q3 and Q4, the resultant voltage across load resistor 58 appearing on output line 60. This output pulse may be used for any desired function; as illustrated, the pulse is applied to a memory unit MC916 through a buffer MC900, both of which are conventional units, provided merely to illustrate a possible use for the output signal. By careful selection of the parameters of circuit 10, this output pulse will appear on line 60 only when an input pulse of a predetermined configuration is applied to line 12.

In order to cause circuit 10 to respond only to the desired signal 26, the parameters of the circuit elements must meet certain requirements. Thus, the voltage drop across diode 34 should be set to a predetermined percentage of the pulse amplitude *e, 32 and the exact value depending upon the values of resistor 30 and capacitor 32 and upon the type of transistor used at Q2. The charging time of RC network 30, 32 must be slightly longer than the predetermined value Td* of the pulse duration, so that a desired pulse will not drive Q2. A pulse which lasts longer than time T*d* will charge capacitor 32 to a value in excess of the threshold of diode 34, causing the diode to break down and raising the voltage on the base of transistor Q2 from ground potential to a value which will cause Q2 to become conductive. Conduction of Q2 places an effective short circuit across capacitor 42 and causes this capacitor to discharge to ground, whereby the circuit rejects the too-long pulse.

The parameters of the amplitude sensing RC network 40, 42 are set so that its RC time constant is equal to a fraction of the pulse duration T*d*. Thus, the capacitor 42 will not charge to its full value unless the pulse duration is at least that fraction of T*d;* further, it will not charge to its full value unless the pulse amplitude is at least equal to the value *e*. Thus, it will be seen that if the input pulse 26 has too short a duration, capacitor 42 will not charge to its full value; if it has too low an amplitude, capacitor 42 will not charge to its full value; and if the pulse is too long, capacitor 32 will charge, causing transistor Q2 to become conductive to discharge capacitor 42.

The fall time sensing network 44, 46 is adjusted to have a time constant that is slightly longer than the fall time T*f* of pulse 26. Since the conductivity of transistor switch Q3 depends upon its bias, i.e., on the difference between the voltages applied to its emitter and its base, capacitor 42 must retain a certain amount of the charge applied by pulse 26 and the base voltage must decrease below that level in order to permit Q3 to become conductive; thus, capacitor 46 must be chosen so that the base of Q3 follows the voltage decay, or tailing edge, of pulse 26, and this decay rate must be greater than that of the voltage across capacitor 42. If the time constant of RC network 44, 46 is not longer than T*f*, the voltage across capacitor 46 will not follow the amplitude decay of pulse 26 and insufficient voltage will appear between the base and emitter of 23 to switch Q3 to conduction. Thus, the trailing edge of pulse 26 must occur at a preselected time, and must fall at a preselected rate before Q3 will be turned on by the base-emitter voltage difference.

The final requirement of the circuit is that resistors 50 and 52 be adjusted to switch transistor Q4 into conduction if Q3 becomes conductive under proper conditions. Therefore conduction of Q4 is made to depend not only upon Q3 conducting, but upon the proper voltage appearing on capacitor 42 when Q3 does become conductive, whereby the proper bias will then be provided by resistors 50, 52 to switch Q4 on; conductivity of Q4 then produces a bias voltage on the base of transistor Q3 due to current flow through resistors 44 and 56. This bias voltage will hold Q3 conductive if the voltage on capacitor 42 is sufficient to maintain the required base-emitter voltage drop. Transistor switches Q3 and Q4 thereby comprise a regeneration latching switch having a threshold value dependent upon the various circuit parameters, whereby an output pulse can be produced on line 60 only when the input pulse 26 meets the requirements of circuit 10.

Thus, there has been provided a pulse recognition circuit having a latching operation which will respond only to an input pulse having a specific succession of characteristics, whereby the circuit will discriminate against signals having their amplitude, duration time or fall time lying outside predetermined values. The circuit will fail to respond to a short pulse length because capacitor 42 will not charge to a value sufficient to exceed the threshold of transistors Q3 and Q4. The circuit will fail to respond to a pulse longer than the time constant of resistor capacitor network 30, 32 because switch Q2 will close and discharge capacitor 42 before the trailing edge of the pulse can provide the voltage drop on the base of Q3 which is required to fire Q3. The circuit will fail to respond if the fall time of the pulse is slower than the time constant of sensing network 44, 46 because the emitter and base of Q3 will both follow the trailing edge of the pulse and transistor Q3 will not be triggered. Finally the circuit will fail to respond if the amplitude of the input pulse is of insufficient level to exceed the threshold of transistors Q3 and Q4. However, upon reception of a valid signal, the regeneration switch Q3–Q4 will latch and a sharp positive pulse will be produced on line 60. By utilizing the voltage charge accumulated on the several capacitors of the circuit, and particularly capacitor 42, to provide the bias level required for the various transistors, the input signal 26 provides all of the power required for the circuit, and no additional power source, such as a battery, is required. It will be recognized that numerous modifications and variations may be made in the basic concepts illustrated herein, and such changes will be obvious to those skilled in the art. It is therefore desired that the foregoing description be taken as illustrative and that the true spirit and scope of the invention be limited only by the following claims.

I claim:

1. A pulse recognition circuit responsive only to an input pulse having predetermined amplitude, duration, and fall time characteristics, comprising:

an input for receiving an input pulse;

first timing circuit means having a time constant less than the duration of said input pulse and connected to said input for producing a first voltage proportional to the amplitude and duration of said input pulse;

second timing circuit means having a time constant greater than the duration of said input pulse and connected to said input for producing a second voltage proportional to the amplitude and duration of said input pulse;

third timing circuit means including a charge and discharge circuit connected to said input, said third timing circuit having a time constant slightly longer than the said predetermined fall time of said input pulse for producing a third voltage which closely follows the fall time of said input pulse;

output means including first switch means having input, output and control electrodes, said first timing circuit means being connected to said input electrode and said third timing means being connected to said control electrode, whereby said first and third voltages are applied to said input and control electrodes, respectively, and follow the voltage of said input pulse during its rise time and duration, said output means thereafter becoming operative to produce an output pulse only when the fall time of said input pulse has said predetermined characteristic so that said third voltage falls below said first voltage by a predetermined amount; and second switch means connected to said first timing circuit means and responsive to said second voltage for disabling said first timing circuit when said second voltage exceeds a predetermined value corresponding to a selected maximum duration for said input pulse, whereby said output pulse is produced only when said input pulse has said predetermined characteristics.

2. The pulse recognition circuit of claim 1, wherein said output means is a first transistor, said transistor being normally nonconductive but becoming conductive when said first voltage exceeds said third voltage by said predetermined amount.

3. The pulse recognition circuit of claim 2, wherein said output means further includes a second transistor having a control electrode connected through a voltage divider to the output electrode of said first transistor, said second transistor being normally nonconductive but becoming conductive when said first transistor conducts and said first voltage exceeds said predetermined voltage.

4. The pulse recognition circuit of claim 1, wherein each of said first, second, and third timing circuit means for producing said first, second and third voltages, respectively, comprises a resistive-capacitive network for receiving energy from said input pulse, said capacitors storing said received energy to provide bias voltages for said circuit, whereby no external power supply is required.

5. The pulse recognition circuit of claim 4, wherein said second switch means for disabling said first timing circuit means comprises a pulse duration limit switch responsive to said second voltage to discharge the capacitor of said first resistive-capacitive network.

6. The pulse recognition circuit of claim 5, wherein said pulse duration limit switch comprises a transistor connected across the capacitor of said first resistive-capacitive network, said transistor being normally nonconductive and responsive to a predetermined level of said second voltage to switch to its conductive state, thereby to discharge said last-named capacitor.

7. The pulse recognition circuit of claim 1, wherein said output means comprises a regenerative latching switch.

8. The pulse recognition circuit of claim 10, wherein said latching switch includes said first switch means and a third, complementary switch means, said first and third switch means becoming operative to produce said output pulse only when said input pulse has all of said predetermined values.

9. The pulse recognition circuit of claim 7, wherein each of said first, second and third timing circuit means includes a passive pulse storage means.

10. The pulse recognition circuit of claim 9, wherein said first passive storage means stores energy from said input pulse to provide a bias voltage for said output means, whereby said pulse recognition circuit requires no external power supply.

11. The pulse recognition circuit of claim 9, wherein said first, second and third timing circuit means each comprises a resistor-capacitor storage network.

12. The pulse recognition circuit of claim 11, wherein said second switch means comprises a first transistor connected across the capacitor of said first timing circuit, said latching switch and said first timing circuit being disabled by discharge of the capacitor in said first timing circuit through conduction of said transistor.

13. The pulse recognition circuit of claim 12, wherein said first and third switch means comprise second and third transistors.

UNITED STATES PATENT OFFICE
CERTIFICATE OF CORRECTION

Patent No. 3,594,585 Dated July 20, 1971

Inventor(s) JOSEPH A. BOURGET

It is certified that error appears in the above-identified patent and that said Letters Patent are hereby corrected as shown below:

Claim 8, line 1, change "10" to --7--.

Signed and sealed this 14th day of December 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334